(12) United States Patent
Allen

(10) Patent No.: US 9,753,306 B2
(45) Date of Patent: Sep. 5, 2017

(54) EYEWEAR WITH FLEXIBLE BRIDGE

(71) Applicant: Marchon Eyewear, Inc., Melville, NY (US)

(72) Inventor: Carl Allen, Brooklyn, NY (US)

(73) Assignee: Marchon Eyewear, Inc., Melville, NY (US)

( * ) Notice: Subject to any disclaimer, the term of this patent is extended or adjusted under 35 U.S.C. 154(b) by 0 days.

(21) Appl. No.: 14/856,273

(22) Filed: Sep. 16, 2015

(65) Prior Publication Data

US 2016/0077356 A1    Mar. 17, 2016

Related U.S. Application Data

(60) Provisional application No. 62/051,685, filed on Sep. 17, 2014.

(51) Int. Cl.
| | |
|---|---|
| *G02C 5/02* | (2006.01) |
| *G02C 5/06* | (2006.01) |
| *G02C 5/18* | (2006.01) |
| G02C 5/00 | (2006.01) |
| G02C 5/16 | (2006.01) |

(52) U.S. Cl.
CPC ............... *G02C 5/06* (2013.01); *G02C 5/02* (2013.01); *G02C 5/18* (2013.01); *G02C 5/008* (2013.01); *G02C 5/16* (2013.01); *G02C 2200/16* (2013.01)

(58) Field of Classification Search
CPC ... G02C 5/00; G02C 5/04; G02C 5/06; G02C 5/08; G02C 5/008; G02C 5/16; G02C 5/18; G02C 2200/16; G02C 5/02

USPC .................. 351/114, 124, 126, 128
See application file for complete search history.

(56) References Cited

U.S. PATENT DOCUMENTS

| | | | | | |
|---|---|---|---|---|---|
| 1,663,402 | A | * | 3/1928 | Engel ..................... | G02C 5/06 351/126 |
| 2,103,575 | A | * | 12/1937 | Diggins ................ | G02C 5/045 351/126 |
| 2,975,426 | A | * | 3/1961 | Rabb ..................... | G02C 5/006 2/13 |
| 3,395,964 | A | * | 8/1968 | Nieder ................... | G02C 5/06 351/113 |
| 3,402,005 | A | * | 9/1968 | Liautaud ................ | G02C 5/00 351/111 |
| 4,377,328 | A | * | 3/1983 | Ferrandi ................ | G02C 5/16 351/113 |

(Continued)

OTHER PUBLICATIONS

International Search Report, dated Dec. 18, 2015, from corresponding International Application No. PCT/US2015/050679.

(Continued)

*Primary Examiner* — William R Alexander
(74) *Attorney, Agent, or Firm* — Brient Globerman, LLC; Kyle M. Globerman

(57) ABSTRACT

Eyewear comprises a first frame portion that is configured to retain a first lens therein, a second frame portion that is configured to retain a second lens therein, a first temple that is coupled to the first frame portion, a second temple that is coupled to the second frame portion, and a flexible bridge that is positioned intermediate the first frame portion and the second frame portion. In some embodiments, the flexible bridge is formed from a flexible polymer material and a shape-retaining alloy metal at least partially embedded in the flexible polymer material.

17 Claims, 5 Drawing Sheets

(56) References Cited

U.S. PATENT DOCUMENTS

| | | | |
|---|---|---|---|
| 4,955,706 A * | 9/1990 | Schmidthaler | G02C 5/00 351/41 |
| 5,102,215 A | 4/1992 | Nakanishi | |
| 5,160,947 A | 11/1992 | Hyoi | |
| 5,452,028 A * | 9/1995 | Iijima | G02C 5/00 351/111 |
| 5,801,806 A | 9/1998 | Dichiara | |
| 6,135,592 A | 10/2000 | Preutz | |
| 6,139,143 A * | 10/2000 | Brune | G02C 3/003 16/228 |
| 6,168,272 B1 * | 1/2001 | Larrue | G02C 5/00 351/111 |
| 6,419,358 B1 | 7/2002 | Schetky et al. | |
| 7,048,371 B1 * | 5/2006 | Moore | G02C 5/00 351/103 |
| 7,284,853 B2 * | 10/2007 | Friedman | G02C 5/04 351/126 |
| 8,500,270 B2 * | 8/2013 | Kurtin | G02C 5/02 351/124 |
| 2001/0030733 A1 | 10/2001 | Rittmann | |
| 2003/0020866 A1 | 1/2003 | Asano | |
| 2006/0187408 A1 * | 8/2006 | Lee | G02C 9/04 351/47 |
| 2006/0209252 A1 * | 9/2006 | Bush | G02C 7/08 351/156 |
| 2006/0250570 A1 | 11/2006 | Friedman | |
| 2006/0256279 A1 * | 11/2006 | Amioka | G02C 5/08 351/41 |
| 2009/0190087 A1 * | 7/2009 | Hsu | G02C 9/00 351/57 |
| 2014/0251839 A1 * | 9/2014 | Shalon | G02C 5/128 206/5 |
| 2016/0062139 A1 * | 3/2016 | Shalon | G02C 5/08 351/64 |

OTHER PUBLICATIONS

Written Opinion of the International Searching Authority, dated Dec. 18, 2015, from corresponding International Application No. PCT/US2015/050679.

* cited by examiner

EYEWEAR WITH FLEXIBLE BRIDGE

CROSS-REFERENCE TO RELATED APPLICATIONS

This application claims the benefit of U.S. Provisional Patent Application No. 62/051,685, filed Sep. 17, 2014, entitled "Eyewear with Flexible Bridge," the entire disclosure of which is incorporated herein by reference in its entirety.

BACKGROUND

Eyewear frames are typically formed from metal or plastic. In most cases, metal and plastic frames are rigid and will break or deform when flexed or bent. Accordingly, there is a need for improved eyewear that allows the frames to bend and/or flex and to return to its original shape. Various embodiments of the present invention recognize and address the foregoing considerations, and others, of prior art eyewear designs.

SUMMARY OF THE VARIOUS EMBODIMENTS

In various embodiments, eyewear comprises a first frame portion that is configured to retain a first lens therein, a second frame portion that is configured to retain a second lens therein, a first temple that is coupled to the first frame portion, a second temple that is coupled to the second frame portion, and a flexible bridge that is positioned intermediate the first frame portion and the second frame portion. In some embodiments, the flexible bridge is formed from a flexible polymer material and a shape-retaining alloy metal. In some of these embodiments, the shape-retaining alloy material is at least partially embedded in the flexible polymer material. In various embodiments, the flexible bridge is integrally formed with the first frame portion and the second frame portion. In some embodiments, the shape-retaining alloy metal is at least partially received in the first frame portion and the second frame portion. In other embodiments, the shape-retaining alloy metal is embedded in the first frame first portion and the second frame portion and extends substantially from proximate to where the first temple couples to the first frame portion to proximate where the second temple couples to the second frame portion. In some embodiments, the flexible polymer material is translucent. In yet other embodiments, the first and second frame portions are formed from a first polymer material and the flexible polymer is formed from a second polymer material. In some of these embodiments, the first polymer material and the second polymer material is the same material. In yet other embodiments, the first frame portion and the second frame portion are formed from a metal material. In various embodiments, the shape-retaining alloy metal is free floating within the flexible polymer material that forms the flexible bridge. In some embodiments, the eyewear further comprises a first lens and a second lens.

In preferred embodiments, an eyewear frame comprises a frame having a first area configured to retain a first lens and a second area configured to contain a second lens and a flexible bridge portion that couples the first area to the second area. The flexible bridge allows the second frame area to bend with respect to the first frame area at an angle from substantially between 10 degrees and 90 degrees. The flexible bridge portion is formed from a memory metal surrounded at least partially by a flexible polymer material. A first temple is coupled to the first area and a second temple is coupled to the second area. In various embodiments, the memory metal is a shape-retaining alloy metal. In some embodiments, the first area and the second area are integrally formed with the flexible bridge portion. In various embodiments, the first temple is pivotally coupled to the first area and the second temple is pivotally coupled to the second area. In some embodiments, the first temple and the second temple comprise shape retaining memory metal. In some of these embodiments, the shape retaining memory metal of the first temple and the second temple are embedded in a respective flexible polymer material.

In still other preferred embodiments of an eyewear frame, the eyewear frame comprises an upper frame portion that extends from a first end to an opposite second end where the upper frame portion comprises a first portion that is configured to retain a first lens therein, a second portion that is configured to retain a second lens therein and a bridge portion intermediate the first portion and the second portion. A first temple is coupled to the first portion proximate the first end and a second temple is coupled to the second portion proximate the second end. The bridge portion comprises a shape retaining memory metal that is at least partially surrounded by a flexible polymer material. In various embodiments, a portion of the shape-retaining memory metal extends into the first portion and the second portion. In some embodiments, the first portion of the upper frame portion and a second portion of the upper frame portion is formed from a polymer material. In other embodiments, the shape-retaining memory metal is free floating in the flexible polymer material.

BRIEF DESCRIPTION OF THE DRAWINGS

Various embodiments of eyewear with having a flexible bridge and/or brow bar are described below. In the course of this description, reference will be made to the accompanying drawings, which are not necessarily drawn to scale, and wherein.

DETAILED DESCRIPTION

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Eyewear

Figure 1:
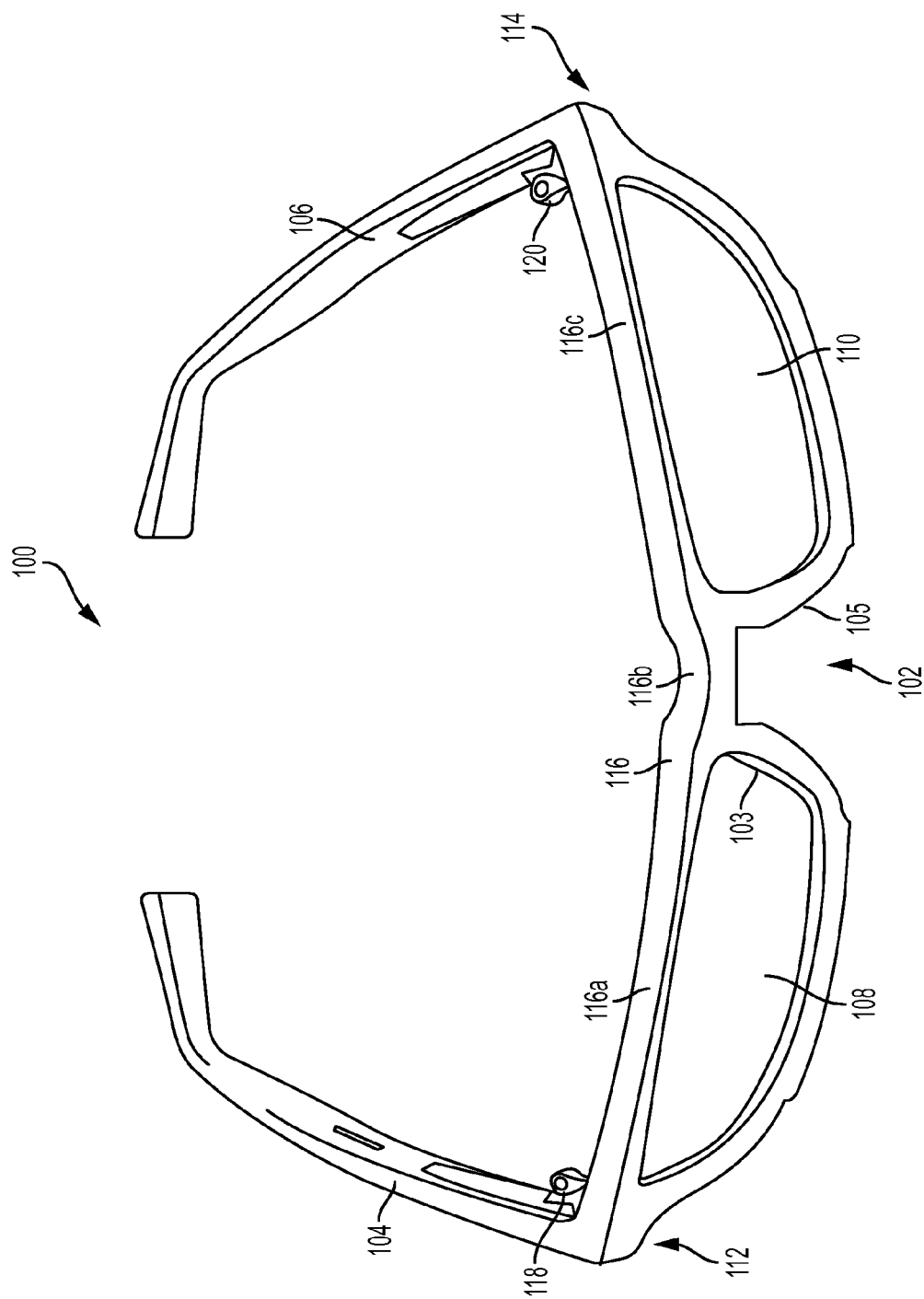
FIG. 1 is a front perspective view of an embodiment of eyewear with a flexible bridge.
Figure 2:
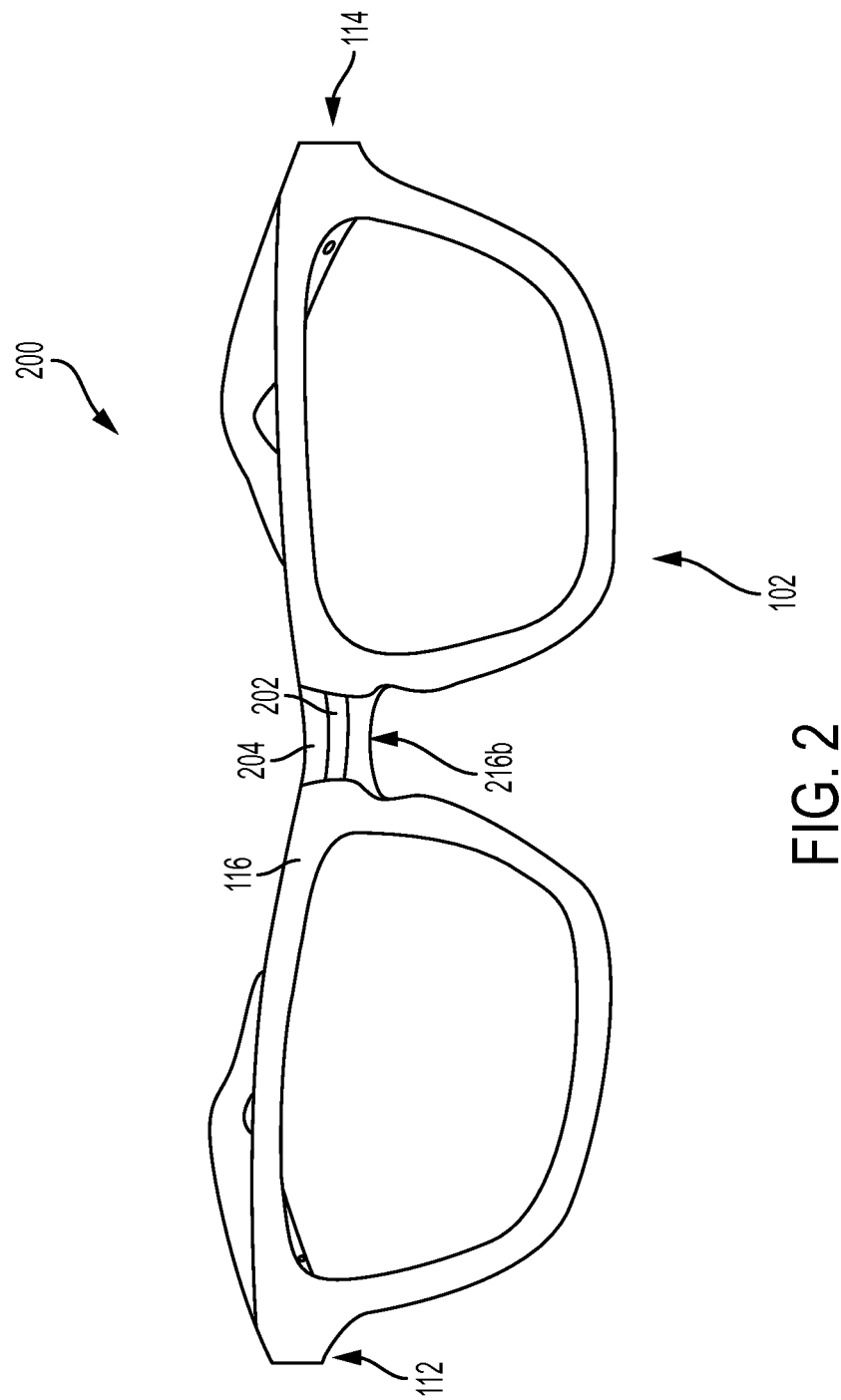
FIG. 2 is a front perspective view of an alternate embodiment of the eyewear of FIG. 1 having a flexible, translucent bridge comprising an insert that comprises, consists of, or consists essentially of a memory shape alloy.

As shown in FIG. 1, eyewear 100, according to various embodiments, includes: (1) an eyewear frame 102; (2) a first temple 104 that is rotatably attached, via a hinge, adjacent a first side edge of the frame 102; and (3) a second temple 106 that is rotatably attached, via a hinge, adjacent a second side edge of the frame 102. These various components are discussed in more detail below.

Eyewear Frame

The eyewear 100, in various embodiments, includes any suitable eyewear frame 102 configured to support one or more lenses 108, 110. In the embodiment shown in this figure, the eyewear frame 102 has a first end 112 and a second end 114 and defines a top surface 116. The top surface 116 has a first portion 116a, a middle portion or bridge 116b, and a second portion 116c. The eyewear frame 102 may be made of any suitable material such as metal, ceramic material, one or more polymers and/or any combination thereof. In various embodiments, the eyewear frame 102 is made of material with varying thickness and flexibility. In particular embodiments, the eyewear frame 102 is made at least substantially of a flexible material, such as flexible plastic or rubber. For example, the eyewear frame 102 may be made of material with any suitable degree of flexibility, ranging from, for example, between about 10 degrees to about 90 degrees.

In particular embodiments, the eyewear frame 102 is configured to support the first and second lenses 108, 110 about the full perimeter of the first and second lenses 108 110. In other embodiments, the eyewear frame 102 may be configured to support the first and second lenses 108, 110 around a portion of each respective lens. In various embodiments, the eyewear frame 102 is configured to support a number of lenses other than two lenses (e.g., a single lens, a plurality of lenses greater than two, etc.). In particular embodiments, the first and second lenses 108, 110 may include prescription lenses, sunglass lenses, or any other suitable type of lens (e.g., reading lenses, non-prescription lenses), which may be formed from glass, polymers, or other suitable material.

Eyewear Nose Pads

The eyewear frame 102 includes a first and a second nose pad 103, 105, which may be configured to maintain the eyewear 200 adjacent the front of a wearer's face such that the lenses 108, 110 are positioned substantially in front of the wearer's eyes while the wearer is wearing the eyewear 200. In particular embodiments, the nose pads 103, 105 may comprise a material that is configured to be comfortable when worn by the wearer (e.g., rubber, etc.). In other embodiments, the nose pads may include any other suitable material (e.g., plastic, metal, etc.). In still other embodiments, the nose pads may be integrally formed with the frame.

Eyewear Hinges

Still referring to FIG. 1, the eyewear frame 102 includes a first and second hinges 118, 120, that attach the first and second temple posts 104, 106 to the frame first and second ends 112, 114, respectively. In various embodiments, the hinges may be formed by any suitable connection to the frame 102 (e.g., ball and socket, spring hinge, etc.). In various embodiments, the hinges 126, 128 can be formed by any suitable connection means.

Various Bridge Embodiments

FIGS. 2-5 illustrate an alternative embodiment of the eyewear 100 shown in FIG. 1.

For purposes of ease of understanding and clarity, only certain parts will be discussed to highlight the differences in the structure of the embodiment shown in FIGS. 2-5 as compared to the embodiment shown in FIG. 1. In this embodiment, the bridge 216b of FIG. 1 is replaced with a flexible bridge 216b that includes a flexible, memory shape alloy insert 202 (e.g. a shape-retaining memory metal) that is encased in or embedded in a flexible bridge material 204.

In various embodiments, the flexible bridge 216b includes: (1) an elongated strip of FLEXON® material 202 (e.g., generally rectangular in shape) that extends in a substantially horizontal orientation when the eyewear are worn properly by a user; and (2) a length of flexible material (e.g., rubber, polymer, etc.) that surrounds and, in various embodiments, at least substantially encases the FLEXON® material 202. In various embodiments, the insert 202 is made of FLEXON® (or any other suitable material consisting of, consisting essentially of, or comprising a suitable memory shape alloy), which can "remember" and return to its original set shape (e.g., a shape-retaining memory metal such as FLEXON® material). This may, for example, allow the eyewear to be flexed about its bridge without permanently changing the shape of the eyewear.

The flexible insert 202 may be "floating in" the eyewear frame 102 material or may be integrally formed with the eyewear frame 102. In various embodiments, the portion of the flexible material 204 surrounding the insert 202 may be transparent or translucent, which may allow a user to at least partially see the flexible insert 202 from outside the bridge 216b. In other embodiments, the portion of the material 204 surrounding the insert 202 may be opaque, which may prevent viewing of the insert 202 from the outside. For example, the eyewear 100 shown in FIG. 1 includes the flexible insert 202 (not seen in FIG. 1) disposed within an opaque, flexible outer bridge 116b material.

In various embodiments, the eyewear frame 102 may include any number of flexible inserts. In other embodiments, the flexible insert may be formed at any point along the frame top surface 116. In certain embodiments, the flexible insert may be formed in any shape (e.g., linear, rectangular, triangular, circular, etc.). In a particular embodiment, the flexible insert 202 extends substantially along the entire length of the translucent bridge 216b. In various embodiments, the insert 202 may be longer and may, for example, extend at least partially or entirely along the length of the frame's top surface 116 (e.g., from the eyewear frame first end 112 to the eyewear frame second end 114). In other embodiments, the flexible insert 202 may extend at least about 80% of the way between the eyewear frame first end 112 to the eyewear frame second end 114. In still other embodiments, the flexible insert 202 may be between about one and about four inches in length. In various embodiments, the flexible insert 202 may be located in any position between the eyewear frame first end 112 and the eyewear frame second end 114.

Figure 3:
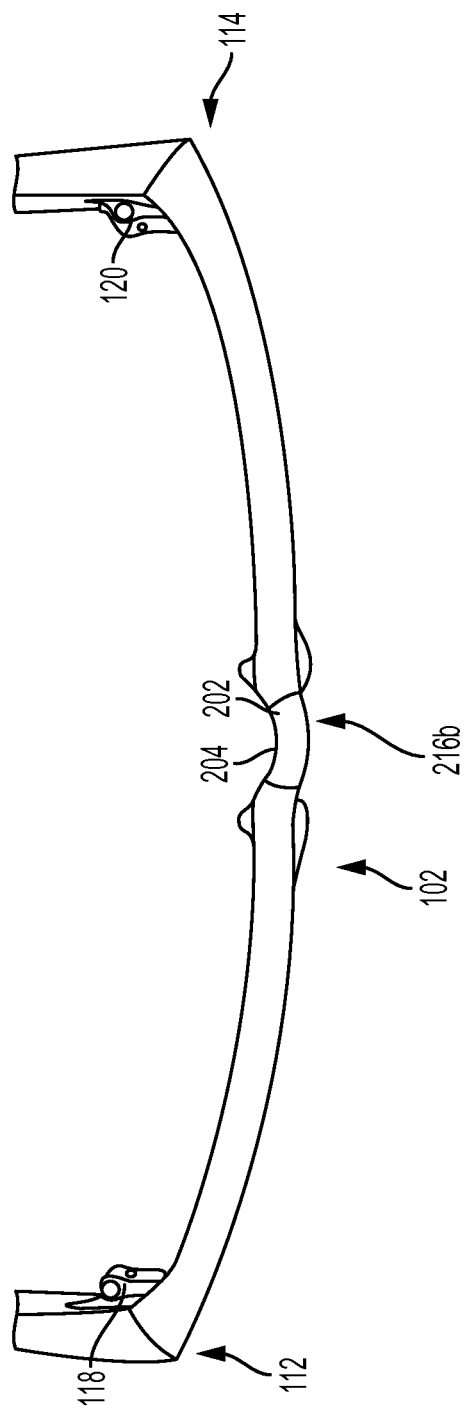
FIG. 3 is a partial top view of the eyewear of FIG. 2.
Figure 4:
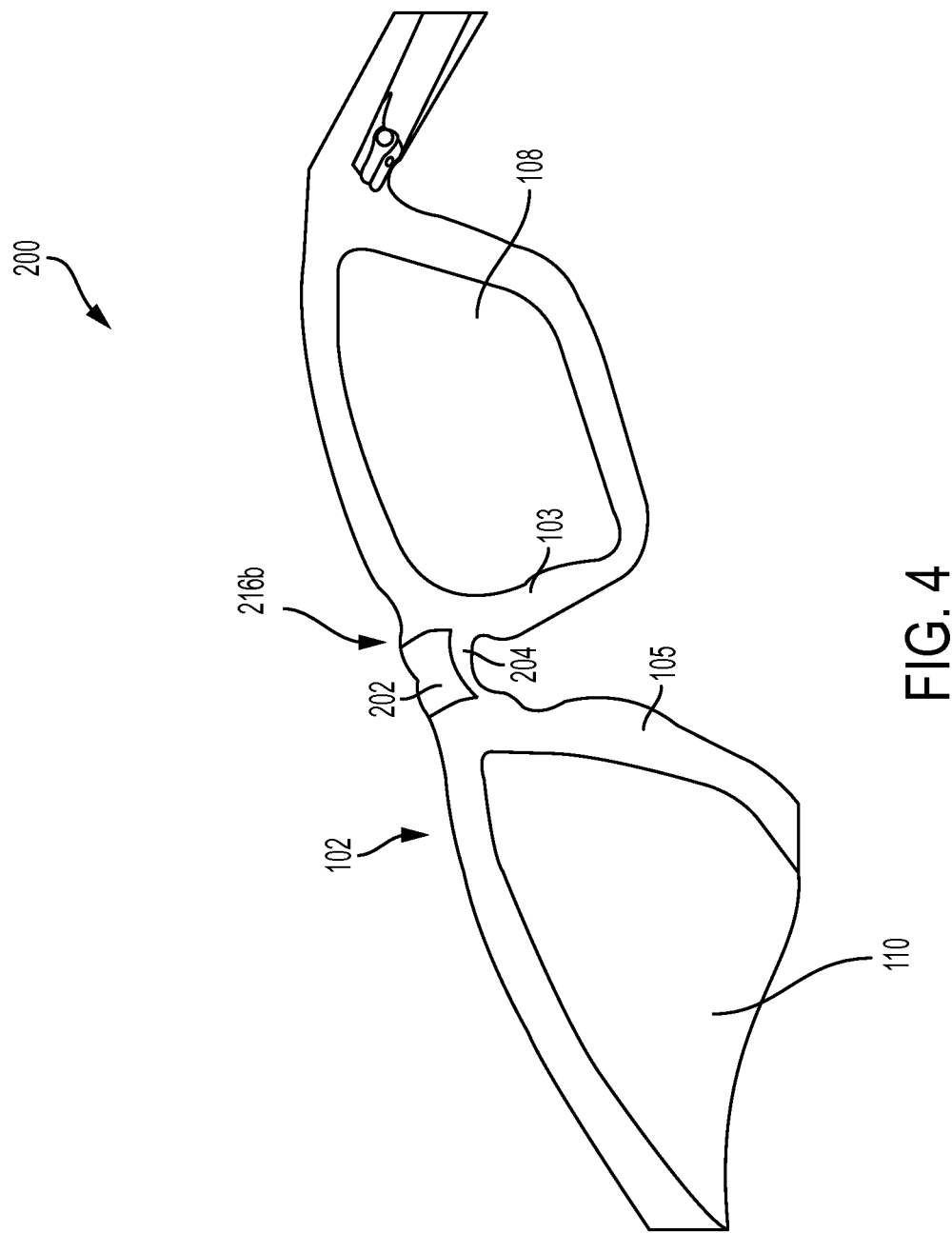
FIG. 4 is a partial rear perspective view of the eyewear of FIG. 2.
Figure 5:
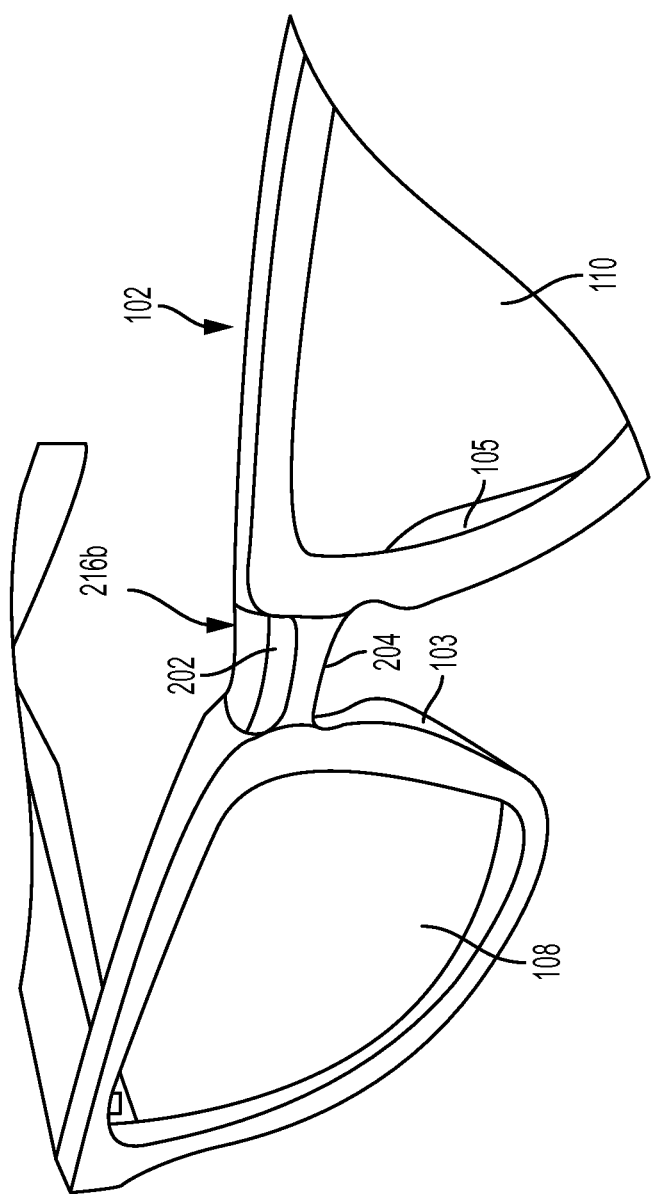
FIG. 5 is a partial front perspective view of the eyewear of FIG. 2.

As may be seen in FIGS. 3-5, the translucent material 204 may fully encompass the flexible insert 202. In various embodiments, the flexible insert 202 may extend beyond the flexible material 204 along the frame's top surface 116. In particular embodiments, the flexible insert 202 is centrally located within the translucent material 204 within the bridge 216b.

CONCLUSION

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. For example, the eyewear described in these embodiments may include any other suitable eyewear, such as, for example, ski or swim goggles, sunglasses, safety goggles or glasses, etc. Therefore, it is to be understood that the invention is not to be limited to the specific embodiments disclosed herein, and that the modifications and other embodiments are intended to be included within the scope of the appended exemplary concepts. Although specific terms are employed herein, they are used in a generic and descriptive sense only and not for the purposes of limitation.

What is claimed is:

1. Eyewear comprising:
   a. a first non-metallic frame portion that is configured to retain a first lens therein;
   b. a second non-metallic frame portion that is configured to retain a second lens therein;
   c. a first temple coupled to the first non-metallic frame portion;
   d. a second temple coupled to the second non-metallic frame portion; and
   e. a flexible bridge positioned intermediate the first non-metallic frame portion and the second non-metallic frame portion, wherein:
      i. the flexible bridge is formed from a flexible material and a shape-retaining alloy metal, wherein the shape-retaining alloy metal includes a first end and a second end, and
      ii. the shape-retaining alloy metal is one of (1) fully encased and free floating within the flexible material that forms the flexible bridge, or (2) surrounded by the flexible material intermediate the first end of the shape-retaining alloy metal and the second end of the shape-retaining alloy metal so that the first end of the shape-retaining alloy metal is embedded in the first non-metallic frame portion and the second end is embedded in the second non-metallic frame portion.

2. The eyewear of claim 1, wherein the flexible bridge is integrally formed with the first non-metallic frame portion and the non-metallic second frame portion.

3. The eyewear of claim 1, wherein the shape-retaining alloy metal is embedded in the first non-metallic frame first portion and the second non-metallic frame portion and extends substantially from proximate where the first temple couples to the first non-metallic frame portion to proximate where the second temple couples to the second non-metallic frame portion.

4. The eyewear of claim 1, wherein the flexible material is translucent.

5. The eyewear of claim 1, wherein the first and second non-metallic frame portions are formed from a first polymer material and the flexible polymer is formed from a second polymer material.

6. The eyewear of claim 5, wherein the first polymer material and the second polymer material are the same material.

7. The eyewear of claim 1, wherein the shape-retaining alloy metal between the first end and the second end is a unitary component.

8. The eyewear of claim 1, further comprising a first lens and a second lens.

9. An eyewear frame comprising:
   a. a frame having a first area configured to retain a first lens and a second area configured to contain a second lens;
   b. a flexible bridge portion that couples the first area to the second area, wherein the flexible bridge allows the second frame area to bend with respect to the first frame area at an angle from substantially between 10 degrees and 90 degrees, wherein the flexible bridge portion is formed from a memory metal that is fully encased within and free floating within a flexible material;
   c. a first temple coupled to the first area; and
   d. a second temple coupled to the second area.

10. The eyewear frame of claim 9, wherein the memory metal is a shape-retaining alloy metal.

11. The eyewear frame of claim 9, wherein the first area and the second area are integrally formed with the flexible bridge portion.

12. The eyewear frame of claim 9, wherein the first temple is pivotally coupled to the first area and the second temple is pivotally coupled to the second area.

13. The eyewear frame of claim 9, wherein the first temple and the second temple comprise shape-retaining memory metal.

14. The eyewear frame of claim 13, wherein the shape-retaining memory metal of the first temple and the second temple are embedded in a respective flexible polymer material.

15. An eyewear frame comprising:
   a. an upper frame portion that extends from a first end to an opposite second end, wherein the upper frame portion comprises a first non-metallic portion that is configured to retain a first lens therein, a second non-metallic portion that is configured to retain a second lens therein, and a bridge portion intermediate the first non-metallic portion and the second non-metallic portion;
   b. a first temple coupled to the first non-metallic portion proximate the first end; and
   c. a second temple coupled to the second non-metallic portion proximate the second end, wherein the bridge portion comprises a shape-retaining memory metal that includes a first end and a second end, and wherein the shape-retaining memory metal is fully surrounded by a flexible material intermediate the first end and the second end of the shape-retaining memory metal so that the first end of the shape-retaining memory metal is embedded in the first non-metallic portion that is configured to retain a first lens therein and the second end is embedded in the second non-metallic portion that is configured to retain a first lens therein.

16. The eyewear frame of claim 15, wherein the first portion of the upper frame portion and the second portion of the upper frame portion are formed from a polymer material.

17. The eyewear frame of claim 15, wherein the shape-retaining memory metal between the first end and the second end is a unitary component.

* * * * *